United States Patent
Bonville et al.

(10) Patent No.: US 6,207,309 B1
(45) Date of Patent: Mar. 27, 2001

(54) ENVIRONMENTAL COMPENSATION METHOD AND APPARATUS FOR A FUEL CELL ASSEMBLY

(75) Inventors: Leonard J. Bonville, Marlborough; Douglas J. Wheeler, Tolland, both of CT (US)

(73) Assignee: International Fuel Cells LLC, South Windsor, CT (US)

( * ) Notice: Subject to any disclaimer, the term of this patent is extended or adjusted under 35 U.S.C. 154(b) by 0 days.

(21) Appl. No.: 09/356,221

(22) Filed: Jul. 16, 1999

(51) Int. Cl.$^7$ ................................................ H01M 08/04
(52) U.S. Cl. .......................... 429/26; 429/27; 429/24; 429/34
(58) Field of Search ................... 429/27, 26, 22, 429/24, 34, 38, 120, 13; 29/623.1

(56) References Cited

U.S. PATENT DOCUMENTS

| | | | |
|---|---|---|---|
| 3,994,748 | 11/1976 | Kunz et al. | 429/13 |
| 4,344,850 | 8/1982 | Grasso | 210/664 |
| 4,769,297 | 9/1988 | Reiser et al. | 429/17 |
| 5,456,889 | 10/1995 | Pow et al. | 422/173.1 |
| 5,503,944 | 4/1996 | Meyer et al. | 429/13 |
| 5,514,487 | 5/1996 | Washington et al. | . |
| 5,750,076 | 5/1998 | Buswell et al. | 422/115 |
| 5,750,281 | * 5/1998 | Washington et al. | 429/39 |
| 5,798,186 | 8/1998 | Fletcher et al. | 429/13 |
| 5,804,326 | * 9/1998 | Chow et al. | 429/26 |

FOREIGN PATENT DOCUMENTS 0 823 743 A2   2/1998   (EP) .

* cited by examiner

*Primary Examiner*—Stephen Kalafut
*Assistant Examiner*—Raymond Alejandro
(74) *Attorney, Agent, or Firm*—McCormick, Paulding & Huber LLP (57) ABSTRACT

An environmental compensation apparatus for an electrochemical fuel cell assembly, wherein a compressible material is dispersed within a coolant flow of the fuel cell assembly and is utilized to compensate for the expansion of the coolant when said fuel cell assembly is subjected to harsh environmental conditions. The compressible material is formed as a plurality of either polymeric or elastomer microspheres, each microsphere having a diameter larger than the pores of an anode or cathode flow field plate, yet smaller than the diameter of a coolant channel.

40 Claims, 3 Drawing Sheets

ENVIRONMENTAL COMPENSATION METHOD AND APPARATUS FOR A FUEL CELL ASSEMBLY

FIELD OF THE INVENTION

This invention relates in general to an environmental compensation method and apparatus for a fuel cell assembly, and deals more particularly with a method and apparatus by which a fuel cell assembly may avoid structural damage to its constituent parts when experiencing harsh environmental conditions.

BACKGROUND OF THE INVENTION

Electrochemical fuel cell assemblies are known for their ability to produce electricity and a subsequent reaction product through the reaction of a fuel being provided to an anode and an oxidant being provided to a cathode, thereby generating a potential between these electrodes. Such fuel cell assemblies are very useful and sought after due to their high efficiency, as compared to internal combustion fuel systems and the like. Fuel cell assemblies are additionally advantageous due to the environmentally friendly chemical reaction by-products that are produced, such as water. In order to control the temperature within the fuel cell assembly, a coolant is provided to the fuel cell assembly. The coolant, typically water, is circulated throughout the fuel cell assembly via a configuration of coolant channels. This concentration and use of water within fuel cell assemblies makes them particularly sensitive to freezing temperatures.

Electrochemical fuel cell assemblies typically employ hydrogen as the fuel and oxygen as an oxidant where, as noted above, the reaction by-product is water. Such fuel cell assemblies may employ a membrane consisting of a solid polymer electrolyte, or ion exchange membrane having a catalyst layer formed thereon so as to promote the desired electrochemical reaction. The catalyzed membrane is disposed between two electrode substrates formed of porous, electrically conductive sheet material—typically carbon fiber paper. The ion exchange membrane is also known as a proton exchange membrane (hereinafter PEM), such as sold by DuPont under the trade name NAFION™.

In operation, hydrogen fuel permeates the porous electrode substrate material of the anode and reacts with the catalyst layer to form hydrogen ions and electrons. The hydrogen ions migrate through the membrane to the cathode and the electrons flow through an external circuit to the cathode. At the cathode, the oxygen-containing gas supply also permeates through the porous electrode substrate material and reacts with the hydrogen ions and the electrons from the anode at the catalyst layer to form the by-product water. Not only does the ion exchange membrane facilitate the migration of these hydrogen ions from the anode to the cathode, but the ion exchange membrane also acts to isolate the hydrogen fuel from the oxygen-containing gas oxidant. The reactions taking place at the anode and cathode catalyst layers are represented by the equations:

Anode reaction:

Cathode reaction:

Conventional PEM fuels cells have the ion exchange membrane positioned between two gas-permeable, electrically conductive plates, referred to as the anode and cathode plates. The plates are typically formed from graphite, a graphite-polymer composite, or the like. The plates act as a structural support for the two porous, electrically conductive electrodes, as well as serving as current collectors and providing the means for carrying the fuel and oxidant to the anode and cathode, respectively. They are also utilized for carrying away the reactant by-product water during operation of the fuel cell.

When flow channels are formed within these plates for the purposes of circulating either fuel or oxidant in the anode and cathode plates, they are referred to as fluid flow field plates. These plates may also function as water transfer plates in certain fuel cell configurations. The water transfer plates usually contain integral coolant passages so that the water transfer plates also serve as cooler plates in addition to their water management functions. When the fluid flow field plates simply overlay channels formed in the anode and cathode porous material, they are referred to as separator plates. Moreover, the fluid flow field plates may have formed therein reactant feed manifolds which are utilized for supplying fuel to the anode flow channels or, alternatively, oxidant to the cathode flow channels. They also have corresponding exhaust manifolds to direct unreacted components of the fuel and oxidant streams, and any water generated as a by-product, from the fuel cell. Alternatively, the manifolds may be external to the fuel cell itself, as shown in commonly owned U.S. Pat. No. 3,994,748 issued to Kunz et al. and incorporated herein by reference in its entirety.

The catalyst layer in a fuel cell assembly is typically a carbon supported platinum or platinum alloy, although other noble metals or noble metal alloys may be utilized. Multiple electrically connected fuel cells consisting of two or more anode plate/membrane/cathode plate combinations are referred to as a fuel cell stack. A fuel cell stack is typically electrically connected in series.

Recent efforts at producing the fuel for fuel cell assemblies have focused on utilizing a hydrogen rich gas stream produced from the chemical conversion of hydrocarbon fuels, such as methane, natural gas, gasoline or the like. This process produces a hydrogen rich gas stream efficiently as possible, thereby ensuring that a minimal amount of carbon monoxide and other undesirable chemical byproducts are produced. This conversion of hydrocarbons is generally accomplished through the use of a steam reformer and related fuel processing apparatus well known in the art.

The anode and cathode plates provide coolant channels for the circulation of a water coolant, as well as the wicking and carrying away of water produced as a by-product of the fuel cell assembly operation. The water so collected and circulated through a fuel cell assembly in the coolant channels is susceptible to freezing below 32° F. (0° C.) and may therefore damage and impair the operation of the fuel cell assembly as the water expands when it freezes. It is therefore necessary to provide a method and apparatus which may protect the fuel cell assembly during times of harsh environmental conditions.

U.S. Pat. No. 5,798,186 issued to Fletcher et al. on Aug. 25, 1998 discloses various electrical heating configurations for directly and indirectly thawing a fuel cell stack which has frozen. Additionally, mention is made as to having compliant or compressible devices located within the stack manifold headers for to accommodate the expansion of freezing water within the fuel cell stack. Such a system, localized only within the stack manifold headers, will not fully protect the entirety of the fuel cell stack or coolant channels from the effects of freezing and expanding coolant.

With the forgoing problems and concerns in mind, it is the general object of the present invention to provide a fuel cell assembly with an environmental compensation apparatus which overcomes the above-described drawbacks even in times of freezing temperatures.

SUMMARY OF THE INVENTION

It is an object of the present invention to provide an environmental compensation apparatus for a fuel cell assembly.

It is another object of the present invention to provide an effective cooling system for an operational fuel cell assembly while also ensuring that excessive water is transported away.

It is another object of the present invention to provide a environmental compensation apparatus for counterbalancing the detrimental expansion of water within the fuel cell assembly due to freezing temperatures.

It is another object of the present invention to provide a environmental compensation apparatus which is present throughout the fuel cell assembly, thereby effectuating complete freeze protection.

According to one embodiment of the present invention, a fuel cell assembly has an electrolyte, an anode and a cathode. The anode and the cathode are each adapted to support anode and cathode flow field plates through which flows of fuel and oxidant are fed to the anode and the cathode, respectively. In addition, the anode and the cathode flow field plates are adapted to support a coolant channel through which a flow of coolant is circulated.

An inlet coolant manifold is utilized for introducing the coolant to the fuel cell assembly while an exhaust coolant manifold is utilized for exhausting the coolant from the fuel cell assembly.

Moreover, a compressible material is dispersed throughout the coolant and is capable of compensating for the expansion of the coolant during times when the fuel cell assembly experiences temperatures at or below a predetermined temperature.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
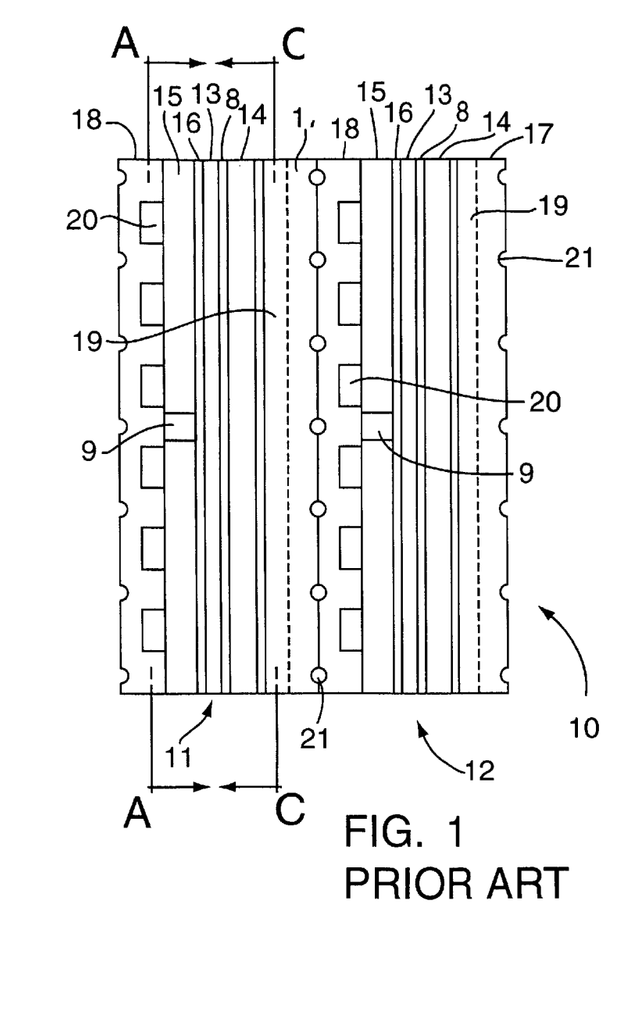
FIG. 1 illustrates a section taken through two PEM fuel cells arranged in series, according to one embodiment of the present invention.

FIG. 1 illustrates a sectional view of a partial fuel cell stack 10 having two electrochemical fuel cell assemblies, 11 and 12, arranged in series contact. During normal operations, each fuel cell assembly, 11 and 12, produces approximately 0.6–0.7 V, therefore it is necessary for a great many fuel cells to be electrically joined together in order to produce a typically desired power level. The fuel cell assemblies 11 and 12 each employ an ion exchange membrane 13 consisting of a solid polymer electrolyte disposed between an anode electrode substrate 15 and a cathode electrode substrate 14. The ion exchange membrane 13 is also referred to as a proton exchange membrane (PEM) and can be a polymer film approximately 0.001 inch thick. The cathode and the anode electrode substrates, 14 and 15 respectively, are formed of porous, electrically conductive sheet material—typically carbon fiber paper having a Teflon® coating.

The ion exchange membrane 13 has a catalyst layer formed on either side of the membrane 13, thereby forming a catalyst-membrane interface which acts to promote the desired electrochemical reaction. The anode catalyst 16 and the cathode catalyst 8 are typically chosen from one of the noble metals, such as platinum, or a noble metal alloy, such as platinum-ruthenium, or the like. The anode electrode substrate 15 in the fuel cell 12 and the cathode electrode substrate 14 in the fuel cell 11 are then electrically coupled through the anode flow field plate 18 and the cathode flow field plate 17 in order to provide a path for conducting electrons between the fuel cells 11 and 12 when an external load is applied.

Still in reference to FIG. 1, fuel is supplied to the anode electrode substrate 15 through the fuel channels 20 formed within an anode flow field plate 18, while an oxidant is supplied to the oxidant channels 19 within a cathode flow field plate 17. The fuel and oxidant together are referred to as reactants. The fuel channels 20 are typically arranged approximately orthogonal to the oxidant channels 19. The fuel channels 20 and oxidant channels 19 may be engraved, milled or molded in the surface of the anode or cathode flow field plates, 18 and 17 respectively, and may be one continuous channel or a plurality of channels. In addition, the fuel and oxidant may be fed through the fuel cell stack 10 utilizing axial feed manifolding, exterior manifolding or a combination of the two—the specific arrangement of manifolding being commonly known to those skilled in the art and not of primary concern with respect to the present invention.

The anode and cathode flow field plates, 18 and 17, are also referred to as water transfer plates and are formed from a porous graphite or a porous graphite-polymer composite, as discussed previously. While the pore size of each of the plates 18 and 17 may differ, typical pore diameters in the plates 18 and 17 range from approximately 1 micrometer to approximately 5 micrometers. Alternatively, a fuel cell 11 wherein only one of the anode and cathode water transfer plates, 18 and 17 respectively, is porous, is also contemplated and may be employed without departing from the broader aspects of the present invention.

In operation, hydrogen fuel permeates the porous electrode material of the anode electrode substrate 15 and reacts at the anode catalyst 16 to form hydrogen ions and electrons. The hydrogen ions migrate through the membrane 13 to the cathode catalyst 8. The electrons produced at the anode catalyst 16 in the fuel cell 12 migrate to the cathode electrode substrate 14 in the fuel cell 11, through both the anode flow field plate 18 of the fuel cell 12 and the cathode flow field plate 17 of the fuel cell 11. At the cathode catalyst 8, the oxidant also permeates through the porous electrode material 14 and reacts with the hydrogen ions and the electrons from the anode catalyst 16 at the catalyst layer 8 to form the by-product water. Not only does the ion exchange membrane 13 facilitate the migration of these hydrogen ions from the anode catalyst 16 to the cathode catalyst 8, but the ion exchange membrane 13 also acts to isolate the hydrogen fuel flowing through fuel channels 20 from the oxygen-containing gas oxidant as it moves through the oxidant channels 19. A coolant, typically water, is supplied to the fuel cells 11 and 12 through coolant channels 21 formed in the anode and cathode flow field plates, 18 and 17 respectively, for the purpose of absorbing from the fuel cells 11 and 12 any excess heat generated by the electrochemical reaction taking place within fuel cells 11 and 12, as well as for humidifying the reactants and providing for the removal of water.

While a proton exchange membrane, noble metal catalyst and carbon fiber paper having a Teflon® coating have each been described, the present invention is not limited in this regard as other membranes and electrode materials may be alternatively utilized, providing they allow for the necessary flow of reactant and by-product molecules, ions and electrons. Likewise, fuel cells having non-solid acid based electrolytes or other fuel cell configurations, such as are disclosed in commonly assigned U.S. Pat. No. 4,769,297 issued to Reiser et al. and U.S. Pat. No. 5,503,944 issued to Meyer et al., incorporated herein by reference in their entirety, may also be employed without departing from the broader aspects of the present invention.

Figure 2:
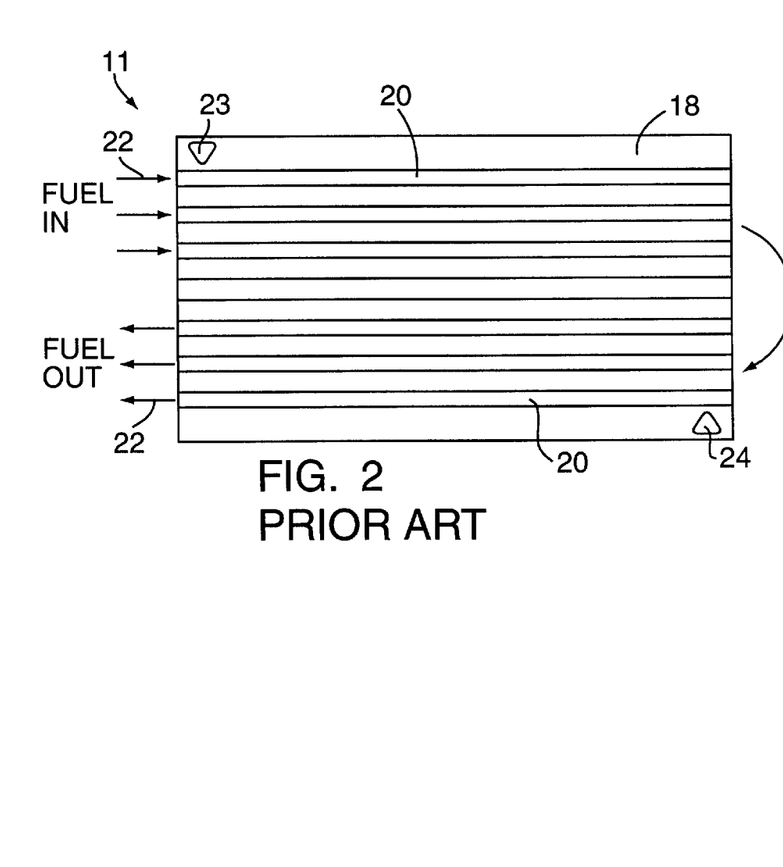
FIG. 2 is a simplified plan view illustration of an anode side of a fuel cell, taken in section along line A of FIG. 1.

FIG. 2 illustrates a section taken along line A of FIG. 1 showing a plan view of the anode side of, for example, the fuel cell 11, including the fuel channels 20 of the anode flow field plate 18. As can be seen from FIG. 2, a fuel supply 22 is supplied to one half of the fuel cell 11 and travels the length of the fuel channels 20. As the fuel supply 22 exits fuel cell 11, the fuel supply 22 is directed towards the downstream side of the fuel cell 11 by an unillustrated fuel turn manifold. In this way, the fuel supply 22 is exposed to the entire anode side of the fuel cell 11. It should be readily apparent that were the single fuel cell 11 but one in a stack of fuel cells, one half of each fuel cell so stacked would receive the fuel supply 22 initially, while the other half of each fuel cell in the stack would receive fuel supply 22 after redirection by the unillustrated fuel turn manifold. Additionally, FIG. 2 shows axial inlet and exhaust coolant manifolds, 23 and 24 respectively, which are utilized for supplying a water coolant to a plurality of coolant channels 21. The architecture of FIG. 2 represents a two-pass fuel flow system owing to the fuel supply 22 making two passes across the surface of the fuel cell 11. A greater number of passes may also be arranged with a corresponding increase in fuel turn manifolds, as is known to those so skilled in the art.

Figure 3:
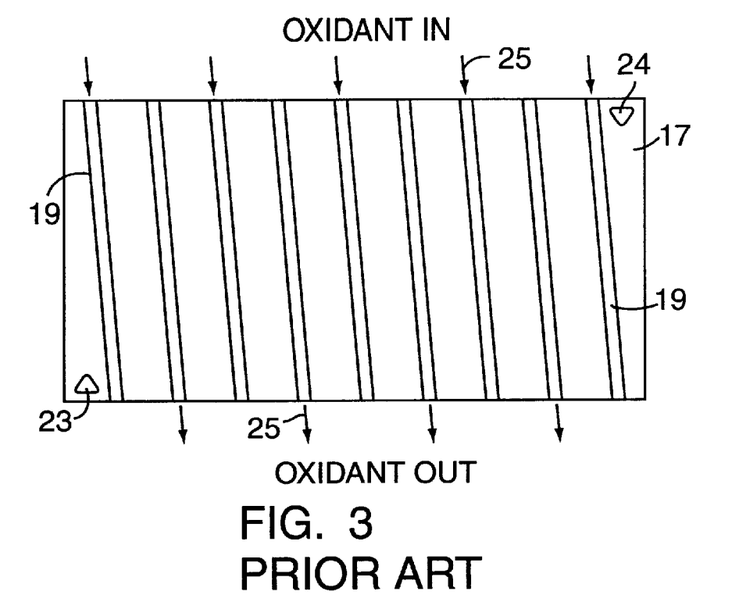
FIG. 3 is a simplified plan view illustration of an cathode side of a fuel cell, taken in section along line C of FIG. 1.

FIG. 3 illustrates a section taken along line C of FIG. 1 showing a plan view of the cathode side of, for example, the fuel cell 11, including the oxidant channels 19 of the cathode flow field plate 17. As can be seen from FIG. 3, an oxidant stream 25 is supplied to one entire side of the fuel cell 11 and travels the length of the oxidant channels 19 until emerging at the far side thereof. In this way the entire cathode side of the fuel cell 11 is exposed to the oxidant stream 25 without the use of an oxidant turn manifold. It should be readily apparent, however, that the oxidant fuel stream 25 may also be configured to incorporate an oxidant turn manifold to produce an oxidant flow pattern similar to the fuel supply pattern as illustrated in FIG. 2. Additionally, FIG. 3 also shows axial inlet and exhaust coolant manifolds, 23 and 24 respectively, which are utilized for supplying a coolant such as water to a plurality of coolant channels 21.

It should be readily apparent that the anode and cathode flow field plates, 18 and 17, may alternatively have any number of fuel and oxidant channels, linear or not, as long as the fuel cell 11 is adequately supplied with these reactants.

With reference once again to FIG. 1, the present invention is directed towards the coolant system of a fuel cell stack 10. The coolant channels 21 of the fuel cell stack 10 serve to address two main concerns of an operating fuel cell assembly. These two concerns are the water management of a fuel cell assembly, as well as the thermal management of a fuel cell assembly.

The coolant channels 21 of the fuel cell assembly 11 shown in FIG. 1 further provide for the thermal management of the fuel cell assembly 11, as well as the fuel cell stack 10 as a whole. By circulating about each fuel cell assembly 11 in a fuel cell stack 10, the water coolant carries away excess heat generated by the electrochemical reactions taking place within the fuel cell stack 10. The temperature of the fuel cell stack 10 can, therefore, be controlled by regulating the temperature and the flow of the coolant through the coolant channels 21, with respect to a process of removing heat from the coolant at a point outside of the fuel cell stack 10, as will be discussed later.

Figure 4:
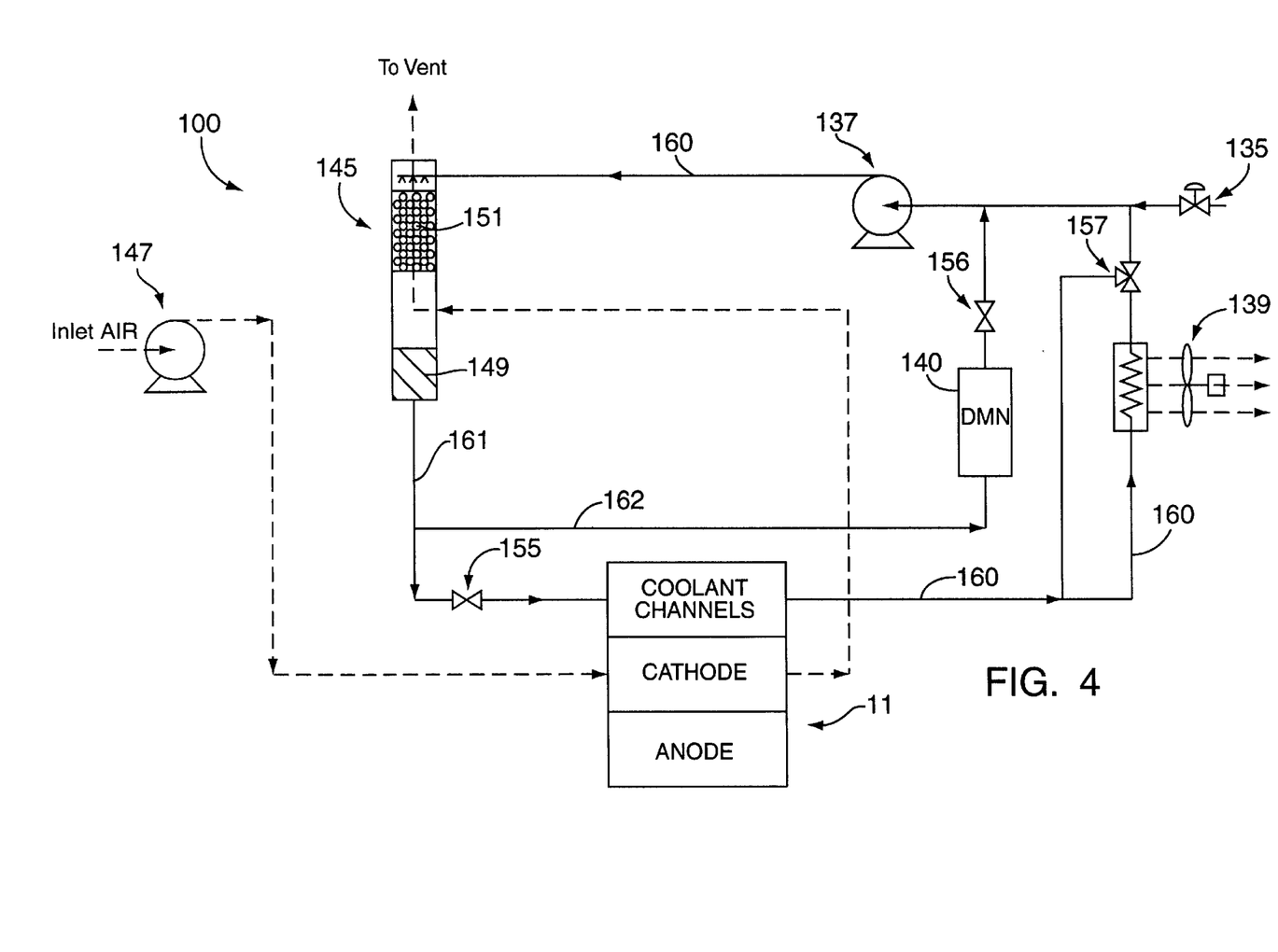
FIG. 4 is a simplified schematic illustration of a coolant system, according to one embodiment of the present invention.

FIG. 4 illustrates the basic components of a typical coolant system 100, as is disclosed in commonly assigned co-pending application entitled "Water Treatment System for a Fuel Cell Assembly", Ser. No. 09/295,732 filed on Apr. 20, 1999, incorporated herein by reference in its entirety. Only a single fuel cell assembly 11 is shown in the coolant system 100 of FIG. 4, including coolant channels 21, an anode flow field plate 18 and a cathode flow field plate 17, for simplicity; however, it will be readily apparent that the coolant system 100 is operable with either a single fuel cell assembly 11 or a fuel cell stack 10. Furthermore, the components of the coolant system 100 are not limited to those components as shown in FIG. 4, but can be any number or arrangement of known elements which, in combination with either a fuel cell assembly 11 or a fuel cell stack 10, comprise an integrated fuel cell system.

Still in reference to FIG. 4, a coolant conduit 160 carries exhausted coolant which has circulated through coolant channels 21 of the fuel cell assembly 11. In circulating through the fuel cell assembly 11, the coolant absorbs the heat generated by the fuel cell assembly 11. A thermal control valve 157 is situated along the coolant conduit 160 for selectively presenting a measured amount of the circulated coolant to a coolant heat exchanger 139, comprising a fan apparatus or the like, which is operable to remove a portion of the absorbed heat from the circulated coolant. Coolant condensate from an unillustrated water recovery system is then selectively added to the coolant conduit 160 through the action of a condensate trim valve 135. The circulated and condensed coolant is subsequently directed by a coolant pump 137 for delivery to a degasifier portion 151 of a degasifying apparatus 145.

The degasifying apparatus 145 of the coolant system 100 houses a reservoir portion 149 for storing purified coolant. An oxidant source apparatus 147, typically a variable speed blower or the like, is the primary source of oxidant for the cathode 17 of fuel cell assembly 11. The oxidant source apparatus 147 provides the cathode 17 of the fuel cell assembly 11 with a supply of oxygen-rich oxidant directly. A coolant exit conduit 161 serves as a path for returning water treated by the degasifying apparatus 145 to the coolant channels 21 of the fuel cell assembly 11. A trim valve 155 controls the pressure of the treated water which is returned to the coolant channels 21.

In operation, the coolant system 100 of FIG. 4 delivers all of the circulated coolant through the coolant conduit 160 to the degasifying apparatus 145. The circulated coolant passes through the degasifier portion 151 in a counter-current manner to the oxidant air which has been exhausted by the cathode 17 and introduced into the degasifying apparatus 145 below the degasifier portion 151. Mass transfer in the degasifier portion 151 results in a significant fraction of any dissolved gases in the coolant diffusing into the oxidant stream, thus stripping most of the dissolved gases from the coolant.

The coolant system 100 shown in FIG. 4 also illustrates other coolant modification devices. A demineralizer 140 is supplied through a trim conduit 162 with a portion of the purified coolant, according to the action of a coolant trim valve 156, for the reduction of suspended and dissolved solids in the purified coolant. The coolant heat exchanger 139 is located upstream of the demineralizer 140 so as to provide the circulated coolant at a temperature appropriate for proper functioning of the demineralizer 140, approximately 140° F. or less.

It should be readily appreciated that the trim valves in FIG. 4 are controlled so as to maintain a system balance between the reactant flows, according to the rate of use of the fuel cell assembly 11, and that reformed fuel is supplied to the anode electrode 18 of the fuel cell assembly 11 from an unillustrated fuel processing system.

The coolant system 100 of FIG. 4 thereby provides for the continuous supply and circulation of the water coolant throughout the fuel cell assembly 11, or alternatively, through the fuel cell stack 10.

While it should be readily apparent that utilizing water as a coolant within a fuel cell stack 10 is beneficial for the purposes of water and thermal management, problems arise when a fuel cell stack 10 so equipped experiences freezing temperatures; that is, temperatures at or below 32° F. (0° C.). When a fuel cell stack 10, including the components of the coolant system 100, experience temperatures at or below the freezing point of water, the water contained within the fuel cell stack 10 and the coolant system 100 begins to freeze and expand and may possibly cause damage to components of the fuel cell stack 10 and coolant system 100, such as the coolant manifolds, the flow field plates and other structures within the fuel cell stack 10. It would therefore be very beneficial to equip a fuel cell stack 10 with an apparatus which compensates for the freezing of the fuel cell stack 10 and assuredly prevents damage to the fuel cell stack 10 and coolant system 100 due to the corresponding expansion of the water coolant.

Figure 5:
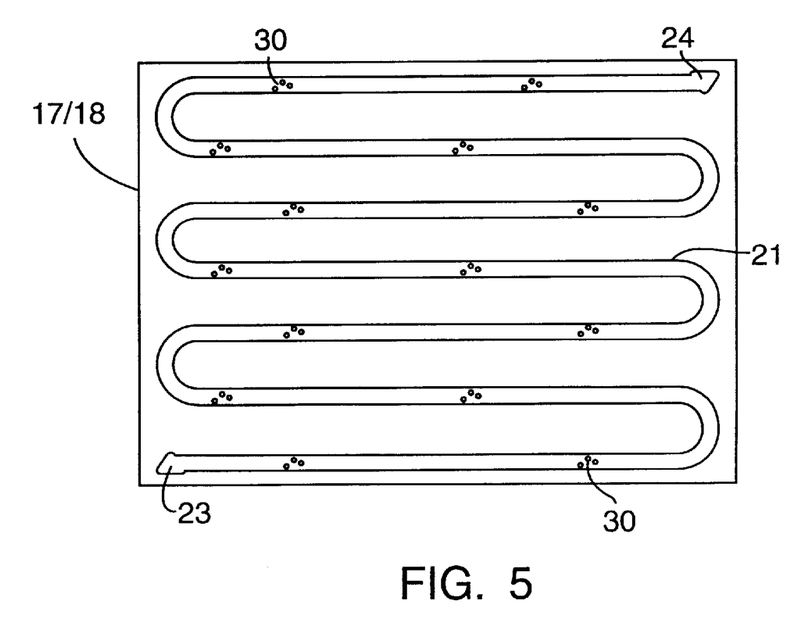
FIG. 5 is a simplified plan view illustration of a coolant channel having a compressible material dispersed within, in accordance with a preferred embodiment of the present invention.

It is a major aspect of the present invention, therefore, to provide such an environmental compensation apparatus for a fuel cell stack 10. FIG. 5 illustrates such an environmental compensation apparatus according to the preferred embodiment of the present invention. As shown in FIG. 5, a coolant channel 21 may be engraved, milled or molded in the surface of the anode or cathode flow field plates, 18 and 17 respectively, opposite that of the fuel channels 20 or oxidant channels 19. Although FIG. 5 illustrates one axially fed continuous coolant channel 21, it should be readily apparent that a plurality of channels 21 may be engraved, milled or molded in the anode or cathode flow field plates, 18 and 17 respectively, each coolant channel having a diameter on the order of approximately 200 micrometers to approximately 600 micrometers.

The coolant channel 21 of the present invention is supplied with a water coolant, as fed through the fuel cell stack 10 by an axial inlet coolant manifold 23 and exhausted from the fuel cell stack 10 by an axial exhaust coolant manifold 24. The water coolant has dispersed therein a concentration of compressible materials which act to relieve the stress associated with the expansion of the water coolant as it freezes. In general, the expansion of the water coolant from a liquid state to a solid state typically results in a corresponding increase in coolant volume on the order of approximately 9%. Therefore, if present in the coolant supply at approximately 20% by volume, the compressible material should be compressible by approximately 50% in order to compensate for the corresponding volumetric expansion of the water coolant when subjected to freezing temperatures. It should, therefore, be readily apparent that the total volume of compressible materials in the coolant supply is a function of the compressibility of the compressible materials, and further, that the compressibility of the compressible materials is the scaling factor which must, when multiplied by the total volume of compressible materials within the coolant supply, be capable of compensating for the approximate 9% expansion of, for example, a frozen water coolant.

In accordance with the present invention, the compressible material may be comprised of a plurality of individual elements, such as compressible microspheres 30. Ideally, the microspheres 30 should be compatible with a PEM environment, nonfriable and tolerant of multiple freeze/thaw cycles, roughly the same density as water so that they disperse well, shear stable to withstanding being pumped through the coolant system 100 and of appropriate particle size so as not to clog the porous material within the fuel cell stack 10. In consideration of these aforementioned properties, the microspheres 30 are preferably manufactured from a polymeric material, such as but not limited to polystyrene or polyvinylidene chloride (PVDC) or elastomers such as but not limited to butyl rubber, EPDM rubber or silicon rubber. These materials are commercially available in sizes between approximately 0.10 micrometers to approximately 250 micrometers under such names as Micropearl™ and Dualite® and are heat resistant to approximately 212° F. (100° C.). The microspheres 30 are preferably formed as homogenous, semi-solid compressible spheres, however, microballons may also be utilized. Microballons are preferrably manufacturered as elastomer or polymeric compressible shells, similar to the materials utilized to manufacture the microspheres 30. It should be understood that either the microspheres 30 or the microballons may be alternatively utilized without departing from the broader aspects of the present invention.

As described previously, the anode and the cathode flow field plates 18 and 17 are porous in order to provide for the flow and diffusion of water molecules and hydrogen ions, although as also mentioned previously, only one of the flow field plates may in fact be porous. In either case, it is imperative that the microspheres 30 be constructed so that similar transport of the microspheres 30 through the pores of the anode and the cathode plates, 18 and 17, is prohibited. The microspheres 30 are therefore constructed to preferrably be approximately 10 to 50 micrometers in diameter, and more preferrably to be approximately 50 micrometers in diameter, several times the diameter of the typical anode and cathode flow field plate pore size which is typically 3 micrometers. This diameter differential prohibits the migration of any microspheres 30 out of the coolant channel 21 while allowing for the necessary water transfer upon which the operation of the fuel cell stack 10 depends. It is equally important, however, that the microspheres 30 be capable of freely circulating throughout the coolant channels 21 and must, therefore, be smaller in diameter than the coolant channels 21. While the microspheres 30 have been described as having a diameter more preferrably of approximately 50 micrometers, the present invention is not limited in this regard as the microspheres may be of any size in a range bounded by, at the lower end, the pore size of the anode and cathode flow field plates and, at the upper end, by the size of the coolant channels 21.

It should be readily apparent that the compressible materials may take any shape or form so long as the dimensions of the compressible materials are such that circulation throughout the coolant channel 21 is possible without blockage, while assuredly prohibiting the migration of the compressible material through the porous anode and cathode plates, 18 and 17.

Still in reference to FIG. 5, the microspheres 30 are compressible to at least 50% of their non-compressed volume and are approximately evenly dispersed throughout the water coolant in an amount preferably between approximately 5% to approximately 30% of the total volume of the water coolant in the coolant channel 21 and the coolant system 100, and more preferably between approximately 10% to approximately 30% of the total volume of the water coolant in the coolant channel 21 and the coolant system 100. A greater or lesser concentration of the microspheres 30 may be dispersed throughout the water coolant in dependence upon the design and operating characteristics of a particular fuel cell stack, as well as in consideration of the particular properties of the compressible material chosen.

In operation, the environmental compensation apparatus of the present invention is primarily passive in nature until the temperature of the fuel cell stack 10 drops to, or below, the freezing point of the coolant within the coolant channels 21. Once the temperature of the fuel cell stack 10 has so dropped, the coolant will subsequently expand and would typically exert stresses to the surrounding structure of the fuel cell stack 10 and the coolant system 100. At this point, however, the microspheres 30 act to compensate for these stresses by absorbing and being compressed by the expansion of the coolant, thereby sparing the structure of the fuel cell stack 10 and the coolant system 100 from the damaging effects of the frozen coolant expansion.

It has been discovered that having the microspheres 30 dispersed throughout the totality of the coolant channels 21 of the fuel cell stack 10 and the coolant system 100 as a whole, as opposed to being situated in a localized area, more effectively and reliably relieves the fuel cell stack 10 and the coolant system 100 from the expansive stressing of the freezing coolant.

It is a major aspect of the present invention that the microspheres 30 of the present invention are elastically resilient in nature. That is, after being compressed by the expansion of the frozen coolant, the microspheres 30 will once again reassert their previous structural form when the temperature of the fuel cell stack 10, the coolant system 100 and the coolant in the coolant channels 21 rises above freezing.

Additionally, the environmental compensation apparatus of the present invention has the added benefit of being adaptable to virtually any existing fuel cell stack 10 by simply introducing the microspheres 30 into the coolant supply of a fuel cell stack 10 according to a desired concentration. By being able to retro-fit existing fuel cell stacks with an apparatus to combat the destructive effects of a freezing coolant, the present invention eliminates the need to have originally manufactured the fuel cell stack with such an apparatus. In doing so, economic waste in replacing existing fuel cell stacks, or modifying them with more cumbersome freeze compensation devices, are elimnated.

While application of the microspheres 30 in a fuel cell assembly 11 or a fuel cell stack 10 has been described, the present invention is not limited in this regard as protection of a fuel cell system, including the constituent elements of a coolant system 100 and a fuel cell assembly 11 or fuel cell stack 10, is also envisioned without departing from the broader aspects of the present invention.

It should be readily apparent that while anode and cathode flow field plates having coolant channels formed therein has been described, the present invention is not limited in this regard as the coolant channels may be formed in a separate cooler assembly without departing from the broader aspects of the present invention. Moreover, the present environmental compensation apparatus is equally applicable to fuel cell assemblies and fuel cell stacks which have solid anode and cathode flow field plates and a dedicated, solid coolant conduit running therethrough. In such arrangements the solid coolant conduit will not be in diffusable communication with the fuel cell assembly or fuel cell stack, such as when fashioned from metal, but would experience the stresses of the freezing coolant nonetheless. The compressible microspheres 30 of the present invention would act to minimize damage to these solid coolant conduits as well.

Although the present invention has been described in connection with a water coolant, the present invention is not limited in this regard as any coolant supply susceptible to expansion would benefit from the inclusion of a compressible material, as herein disclosed, and is contemplated by the present invention.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. An environmental compensation apparatus for an electrochemical fuel cell assembly, said fuel cell assembly having an electrolyte, an anode, a cathode, an anode and a cathode flow field plates and a coolant channel through which a flow of coolant is circulated, said apparatus comprising:

an inlet coolant manifold for introducing said coolant to said fuel cell assembly;

an exhaust coolant manifold for exhausting said coolant from said fuel cell assembly;

a compressible material dispersed throughout said coolant; and wherein said compressible material compensates for the expansion of said coolant within said coolant channel during times when said fuel cell assembly experiences temperatures approximately below a predetermined temperature.

2. The environmental compensation apparatus for a fuel cell assembly according to claim 1, wherein:

one of said anode and said cathode flow field plates is porous and is adapted to have pores of a first predetermined diameter;

said coolant channel is adapted to have a second predetermined diameter; and said compressible material is comprised of a plurality of individual elements each having dimensions larger than said first predetermined diameter and smaller than said second predetermined diameter.

3. The environmental compensation apparatus for a fuel cell assembly according to claim 2, wherein:
said compressible material includes a plurality of one of a polymeric and an elastomer microspheres, each of said microspheres being adapted to have a diameter larger than said first predetermined diameter and smaller than said second predetermined diameter; and
said predetermined temperature is the freezing point of said coolant.

4. The environmental compensation apparatus for a fuel cell assembly according to claim 2, wherein:
said compressible material includes a plurality of one of a polymeric and an elastomer microballons, each of said microballons being adapted to have a diameter larger than said first predetermined diameter and smaller than said second predetermined diameter; and
said predetermined temperature is the freezing point of said coolant.

5. The environmental compensation apparatus for a fuel cell assembly according to claim 3, wherein:
said coolant is water; and
said predetermined temperature is 32° F. (0° C.).

6. The environmental compensation apparatus for a fuel cell assembly according to claim 3, wherein:
one of said anode and said cathode flow field plates is adapted to have pores having diameters of approximately 1 micrometer to approximately 5 micrometers;
said coolant channel is adapted to have a diameter of approximately 200 micrometers to approximately 600 micrometers; and
said microspheres are adapted to have a diameter of approximately 50 micrometers.

7. The environmental compensation apparatus for a fuel cell assembly according to claim 3, wherein:
said polymeric microspheres includes one of a polystyrene and polyvinylidene chloride.

8. The environmental compensation apparatus for a fuel cell assembly according to claim 3, wherein:
said elastomer microspheres includes one of a butyl rubber, an EPDM rubber and a silicon rubber.

9. The environmental compensation apparatus for a fuel cell assembly according to claim 1, wherein:
said inlet and exhaust coolant manifolds are axial manifolds.

10. The environmental compensation apparatus for a fuel cell assembly according to claim 1, wherein:
said compressible material is approximately evenly dispersed throughout said coolant at approximately 5% to approximately 30% of a total volume of said coolant within said fuel cell assembly.

11. The environmental compensation apparatus for a fuel cell assembly according to claim 1, wherein:
compression of said compressible material is sufficient to compensate for an approximately 10% volumetric expansion of a total volume of said coolant within said fuel cell assembly.

12. The environmental compensation apparatus for a fuel cell stack according to claim 1, wherein:
said compressible material is elastically resilient and reassumes its original shape when said fuel cell stack rises above said predetermined temperature after experiencing temperatures at or below said predetermined temperature.

13. An environmental compensation apparatus for a fuel cell stack having a plurality of electrochemical fuel cell assemblies, said fuel cell assemblies each having an electrolyte, an anode, a cathode, an anode and a cathode flow field plates and a coolant channel through which a flow of coolant is circulated, said apparatus comprising:
an inlet coolant manifold for introducing said coolant to said fuel cell stack;
an exhaust coolant manifold for exhausting said coolant from said fuel cell stack;
a compressible material dispersed throughout said coolant; and
wherein said compressible material compensates for the expansion of said coolant within said coolant channel during times when said fuel cell stack experiences temperatures approximately below a predetermined temperature.

14. The environmental compensation apparatus for a fuel cell stack according to claim 13, wherein:
one of said anode and said cathode flow field plates is porous and is adapted to have pores of a first predetermined diameter;
said coolant channel is adapted to have a second predetermined diameter; and
said compressible material is comprised of a plurality of individual elements each having dimensions larger than said first predetermined diameter and smaller than said second predetermined diameter.

15. The environmental compensation apparatus for a fuel cell stack according to claim 14, wherein:
said compressible material is formed as a plurality of one of a polymeric and an elastomer microspheres, each of said microspheres being adapted to have a diameter larger than said first predetermined diameter and smaller than said second predetermined diameter; and
said predetermined temperature is the freezing point of said coolant.

16. The environmental compensation apparatus for a fuel cell stack according to claim 14, wherein:
said compressible material is formed as a plurality of one of a polymeric and an elastomer microballons, each of said microballons being adapted to have a diameter larger than said first predetermined diameter and smaller than said second predetermined diameter; and
said predetermined temperature is the freezing point of said coolant.

17. The environmental compensation apparatus for a fuel cell stack according to claim 15, wherein:
said coolant is water; and
said predetermined temperature is 32° F. (0° C.).

18. The environmental compensation apparatus for a fuel cell stack according to claim 15, wherein:
one of said anode and said cathode flow field plates is adapted to have pores having diameters of approximately 1 micrometer to approximately 5 micrometers;
said coolant channel is adapted to have a diameter of approximately 200 micrometers to approximately 600 micrometers; and
said microspheres are adapted to have a diameter of approximately 50 micrometers.

19. The environmental compensation apparatus for a fuel cell stack according to claim 15, wherein:
said polymeric microspheres includes one of a polystyrene and polyvinylidene chloride.

20. The environmental compensation apparatus for a fuel cell stack according to claim 15, wherein:

said elastomer microspheres includes one of a butyl rubber, an EPDM rubber and a silicon rubber.

21. The environmental compensation apparatus for a fuel cell stack according to claim 13, wherein:

said inlet and exhaust coolant manifolds are axial manifolds.

22. The environmental compensation apparatus for a fuel cell stack according to claim 13, wherein:

said compressible material is approximately evenly dispersed throughout said coolant at approximately 5% to approximately 30% of a total volume of said coolant within said fuel cell stack.

23. The environmental compensation apparatus for a fuel cell stack according to claim 14, wherein:

compression of said compressible material is sufficient to compensate for an approximately 10% volumetric expansion of a total volume of said coolant within said fuel cell stack.

24. The environmental compensation apparatus for a fuel cell stack according to claim 14, wherein:

said compressible material is elastically resilient and reassumes its original shape when said fuel cell stack rises above said predetermined temperature after experiencing temperatures at or below said predetermined temperature.

25. An environmental compensation apparatus for a fuel cell system having in combination a coolant system and an electrochemical fuel cell assembly, said fuel cell assembly having an electrolyte, an anode, a cathode, an anode and a cathode flow field plates and a coolant channel through which a flow of coolant is circulated, said apparatus comprising:

an inlet coolant manifold for introducing said coolant to said fuel cell assembly;

an exhaust coolant manifold for exhausting said coolant from said fuel cell assembly;

a compressible material dispersed throughout said coolant; and wherein said compressible material compensates for the expansion of said coolant within said coolant system during times when said fuel cell system experiences temperatures approximately below a predetermined temperature.

26. The environmental compensation apparatus for a fuel cell system according to claim 25, wherein:

one of said anode and said cathode flow field plates is porous and is adapted to have pores of a first predetermined diameter;

said coolant channel is adapted to have a second predetermined diameter; and said compressible material is comprised of a plurality of individual elements each having dimensions larger than said first predetermined diameter and smaller than said second predetermined diameter.

27. The environmental compensation apparatus for a fuel cell system according to claim 26, wherein:

said compressible material is formed as a plurality of one of a polymeric or an elastomer microspheres which are approximately evenly dispersed throughout said coolant at approximately 5% to approximately 30% of a total volume of said coolant within said fuel cell system, each of said microspheres being adapted to have a diameter larger than said first predetermined diameter and smaller than said second predetermined diameter; and said predetermined temperature is the freezing point of said coolant.

28. The environmental compensation apparatus for a fuel cell system according to claim 26, wherein:

said compressible material is formed as a plurality of one of a polymeric or an elastomer microballons which are approximately evenly dispersed throughout said coolant at approximately 5% to approximately 30% of a total volume of said coolant within said fuel cell system, each of said microballons being adapted to have a diameter larger than said first predetermined diameter and smaller than said second predetermined diameter; and said predetermined temperature is the freezing point of said coolant.

29. The environmental compensation apparatus for a fuel cell system according to claim 27, wherein:

said coolant system includes one of a heat exchanger and a coolant pump;

said coolant is water; and said predetermined temperature is 32° F. (0° C.).

30. The environmental compensation apparatus for a fuel cell system according to claim 27, wherein:

one of said anode and said cathode flow field plates is adapted to have pores having diameters of approximately 1 micrometer to approximately 5 micrometers;

said coolant channel is adapted to have a diameter of approximately 200 micrometers to approximately 600 micrometers; and said microspheres are adapted to have a diameter of approximately 50 micrometers.

31. The environmental compensation apparatus for a fuel cell system according to claim 25, wherein:

compression of said compressible material is sufficient to compensate for an approximately 10% volumetric expansion of a total volume of said coolant within said fuel cell system.

32. The environmental compensation apparatus for a fuel cell system according to claim 27, wherein:

said compressible material is elastically resilient and reassumes its original shape when said fuel cell system rises above said predetermined temperature after experiencing temperatures at or below said predetermined temperature.

33. A method of providing environmental compensation for a fuel cell assembly, said fuel cell assembly having an electrolyte, an anode, a cathode, anode and cathode flow field plates and a coolant channel through which a flow of coolant is circulated, said method comprising the steps of:

dispersing a compressible material throughout said coolant;

introducing said coolant to said fuel cell assembly through an inlet coolant manifold;

circulating said coolant through said coolant channel; and exhausting said coolant from said fuel cell assembly through an exhaust coolant manifold.

34. A method of providing environmental compensation for a fuel cell assembly according to claim 33, said method further comprising the steps of:

adapting one of said anode and said cathode flow field plates to include pores of a first predetermined diameter;

adapting said coolant channel to have a second predetermined diameter; and ensuring that said compressible material has dimensions between said first and said second predetermined diameters.

35. A method of providing environmental compensation for a fuel cell assembly according to claim 34, said method further comprising the steps of:

forming said compressible material as a plurality of one of a polymeric and an elastomer microspheres, each of said microspheres being adapted to have a diameter larger than said first predetermined diameter and smaller than said second predetermined diameter.

36. A method of providing environmental compensation for a fuel cell assembly according to claim 33, said method further comprising the steps of:

dispersing said compressible material approximately evenly throughout said coolant at approximately 5% to approximately 30% of a total volume of said coolant within said fuel cell assembly.

37. A method of providing environmental compensation for a fuel cell assembly according to claim 33, said method further comprising the steps of:

ensuring that compression of said compressible material is sufficient to compensate for an approximately 10% volumetric expansion of a total volume of said coolant within said fuel cell assembly.

38. A method of providing environmental compensation for a fuel cell system having in combination a coolant system and an electrochemical fuel cell assembly, said fuel cell assembly having an electrolyte, an anode, a cathode, anode and cathode flow field plates and a coolant channel through which a flow of coolant is circulated, said method comprising the steps of:

dispersing a compressible material throughout said coolant at approximately 5% to approximately 30% of a total volume of said coolant within said fuel cell system;

introducing said coolant to said fuel cell assembly through an inlet coolant manifold;

circulating said coolant through said coolant channel;

exhausting said coolant from said fuel cell assembly through an exhaust coolant manifold;

adapting one of said anode and said cathode flow field plates to include pores of a first predetermined diameter;

adapting said coolant channels to have a second predetermined diameter; and forming said compressible material as a plurality of polymeric microspheres, each of said microspheres being adapted to have a diameter larger than said first predetermined diameter and smaller than said second predetermined diameter.

39. A method of providing environmental compensation for a fuel cell system according to claim 38, said method further comprising the steps of:

forming said compressible material as a plurality of one of a polymeric and an elastomer microspheres, each of said microspheres being adapted to have a diameter larger than said first predetermined diameter and smaller than said second predetermined diameter.

40. A method of providing environmental compensation for a fuel cell system according to claim 38, said method further comprising the steps of:

forming said compressible material as a plurality of one of a polymeric and an elastomer microballons, each of said microballons being adapted to have a diameter larger than said first predetermined diameter and smaller than said second predetermined diameter.

* * * * *